May 12, 1970  A. MEYER ET AL  3,511,121
APPARATUS FOR THE SHAPING OF INTERNAL AND EXTERNAL
SURFACES DURING A MACHINING OPERATION
Filed Dec. 7, 1966  5 Sheets-Sheet 1

INVENTORS
ALBERT MEYER
FRANZ FERRI

INVENTORS
ALBERT MEYER
FRANZ FERRI

INVENTORS
ALBERT MEYER
FRANZ FERRI

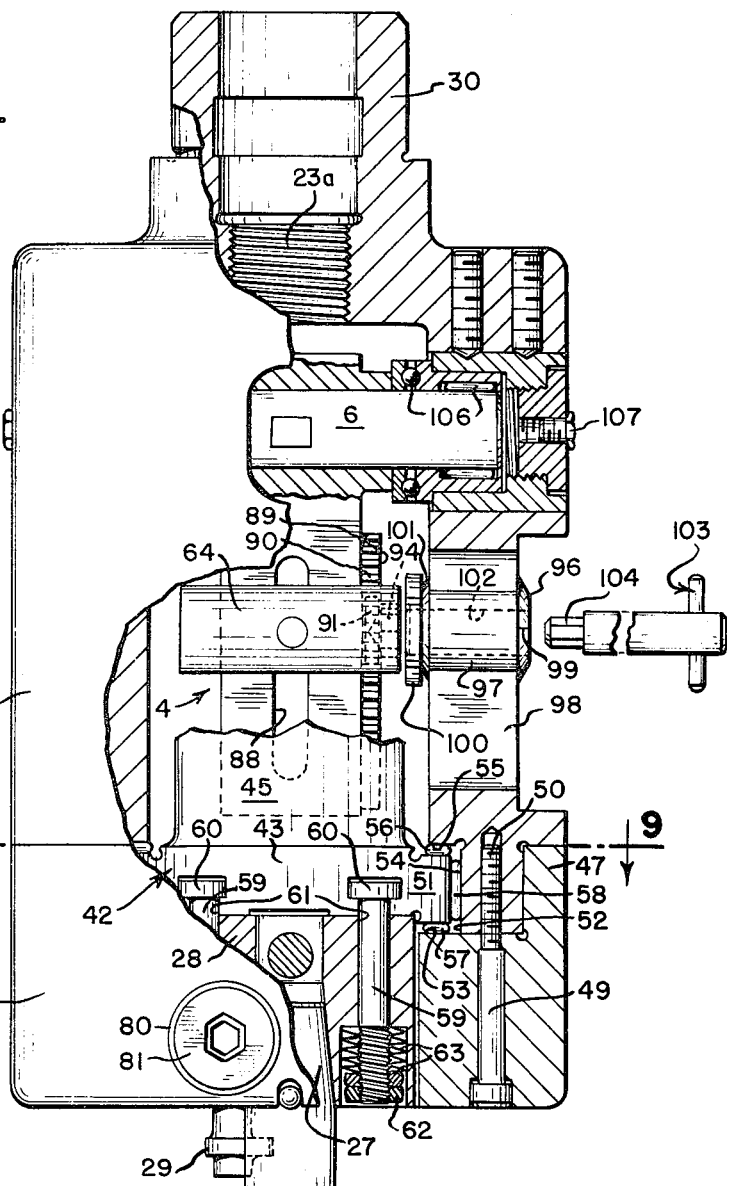
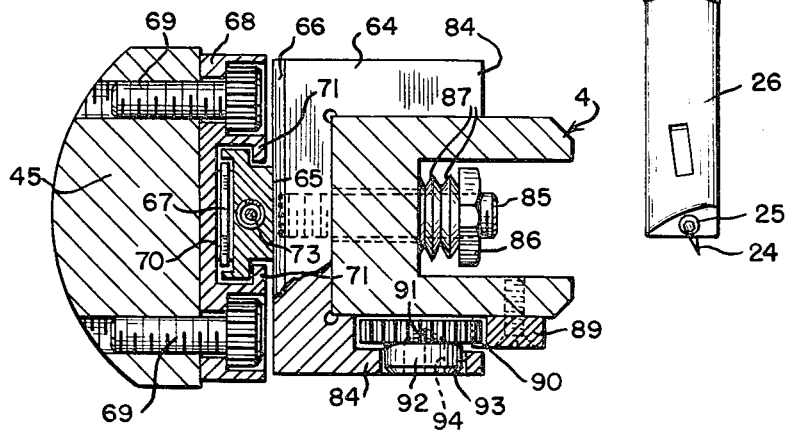

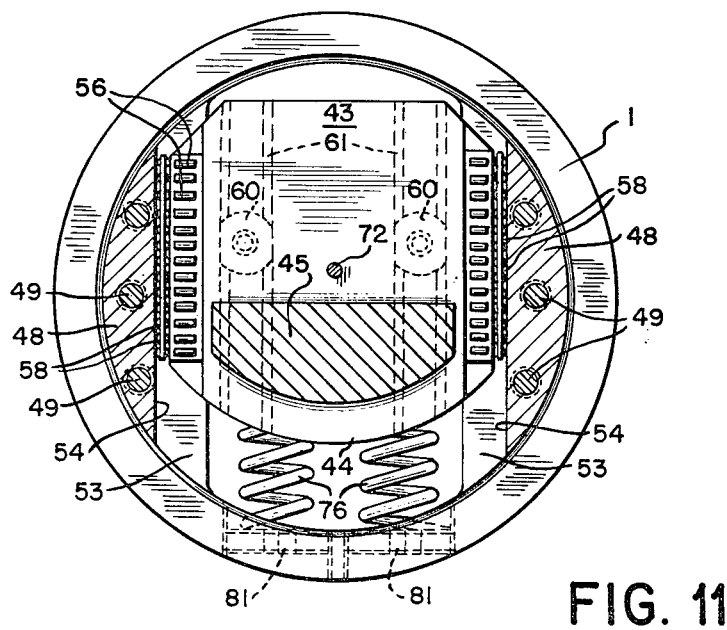
FIG. 9
FIG. 10
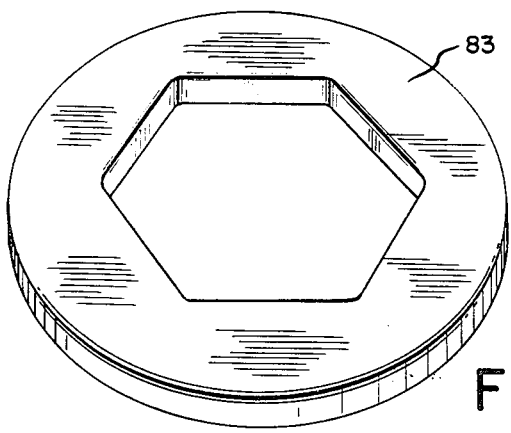
FIG. 11
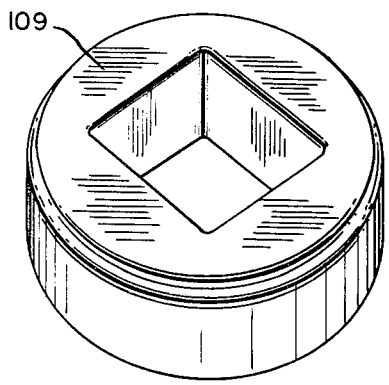
FIG. 13
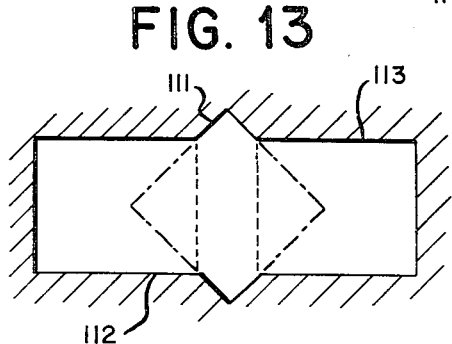
FIG. 12
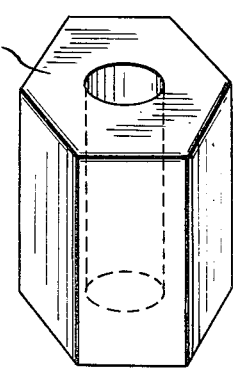
FIG. 14
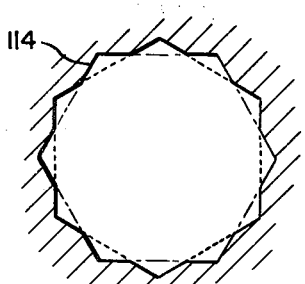
INVENTORS
ALBERT MEYER
FRANZ FERRI

United States Patent Office 3,511,121
Patented May 12, 1970

---

3,511,121
APPARATUS FOR THE SHAPING OF INTERNAL AND EXTERNAL SURFACES DURING A MACHINING OPERATION
Albert Meyer and Franz Ferri, Trimbach, near Olten Solothurn, Switzerland, assignors to Vika A.G., Solothurn, Switzerland
Continuation-in-part of application Ser. No. 554,221, May 31, 1966. This application Dec. 7, 1966, Ser. No. 599,835
Int. Cl. B23b 3/28
U.S. Cl. 82—19                    10 Claims

---

ABSTRACT OF THE DISCLOSURE

This invention relates to apparatus for shaping internal and external surfaces of a workpiece by means of a tool mounted in the rotary tool support of a drill head controlled by a pattern or cam.

---

This application is a continuation-in-part of application Ser. No. 554,221 filed May 31, 1966 now abandoned which is a "streamlined" continuation of application Ser. No. 435,283, filed Feb. 25, 1965.

This invention relates to apparatus for shaping the internal and external surfaces of a workpiece by means of a cutting tool mounted in the tool support of a drill head including a rotary casing and appropriate supporting mechanism, the apparatus being mounted on a machine tool having an automatic feed such as an upright drilling machine, or a turning lathe or other suitable machine tool. The casing is arranged to be driven in rotation by the machine tool on which the apparatus is mounted. The apparatus is intended for the production of various shapes and sizes of angular holes, both through the blind, and of external parts which will hereafter be referred to as profiles. The holes and profiles may be square, polygonal such as hexagonal, or other configuration.

Apparatus of this type heretofore known has not been entirely successful for various reasons. In some instances individual templets are necessary and in others individual patterns are required not only for products of different shape but also for different sizes of the same shape. Moreover the patterns employed are subject to excessive wear, and difficulty has been experienced in satisfactorily cutting the corners of the product, such for example as the corners of a hexagonal or other polygonal aperture. In addition such prior apparatus is capable of removing only small amounts of material from the workpiece, so that considerable time is required for the making of each part and consequently the prior apparatus is not economical to use.

The aim of the present invention is to overcome these disadvantages and to provide an apparatus of the type referred to which is capable of adjustment so as to enable the production of articles differing considerably in size without changing the pattern, in other words, apparatus which permits the size of the angular aperture or profile to be altered within wide limits while using the same pattern, and also maintaining a high degree of precision and ample productivity.

In accordance with our present invention, a cutting tool having a single cutting point is mounted in the tool holder of a rotary drill head or casing which is provided internally with mechanism for shifting the cutting tool crosswise as the casing rotates, so as to cause the point of the cutting tool to trace the outline of the particular form to be cut, such for example as an aperture or profile which is square, polygonal or star-shaped. The apparatus of the invention is therefore useful in making special apparatus, tools, gauges, dies, collets, templets, cams, sockets, molds, flanges, etc.

The mechanism for causing the crosswise shifting of the cutting tool during its rotation includes a cam-like pattern having an annular working face and mounted in stationary position and usually surrounding the upper portion of the rotary casing, the working face of such pattern extending downwardly, or axially of the rotary casing. A lever is mounted within the casing, one arm of which is arranged to engage this working face of the cam-like pattern, and the second arm of which is operatively connected to a carriage which is mounted for crosswise movement within the casing and from the lower end of which the cutting tool projects.

The casing of the drill head is mounted for rotation on a suitable supporting mechanism which is constructed and arranged to enable the removal of one cam-like pattern and its replacement with another when it is desired to set up the apparatus to cut a hole or a profile of different shape. The drill head is also specially constructed so that it can be easily and quickly re-arranged to cut apertures or profiles of different sizes without changing the pattern.

The apparatus includes within the rotary casings a special construction of the connection between the lever and the carriage which provides for smooth operation and eliminates any tendency of the cutting tool to chatter, this being accomplished by means of a structure which eliminates rubbing contact between the second arm of the lever and the carriage head during the oscillating movement of the lever which is imparted to the first arm thereof by the cam-like pattern.

It may be desirable on occasion to cut angular holes of unusual outline or of a size which is beyond the range of the apparatus, and the invention also includes a method of cutting holes of this character.

The invention will be better understood from a consideration of the accompanying drawings showing our apparatus in connection with a vertical drilling machine.

In these drawings:

FIG. 4 is a front elevation of the rotary casing partly broken away with parts shown in central section taken at right angles to the section of FIG. 3;

FIG. 5 is a detailed horizontal section taken on line 5—5 of FIG. 2;

FIG. 8 is a detailed horizontal section taken on line 8—8 of FIG. 3;

FIG. 9 is a horizontal section through the rotary casing taken on line 9—9 of FIG. 4;

FIGS. 10 and 11 are perspective views of workpieces having angular holes cut therethrough by the apparatus of the invention;

FIG. 12 is a perspective view of a workpiece having an external shape cut by the apparatus of the invention;

FIG. 13 is a top view of an aperture of unusual outline made in accordance with the method of the invention; and FIG. 14 is a top view of another aperture of unusual outline made in accordance with the method of the invention.

Figure 1:
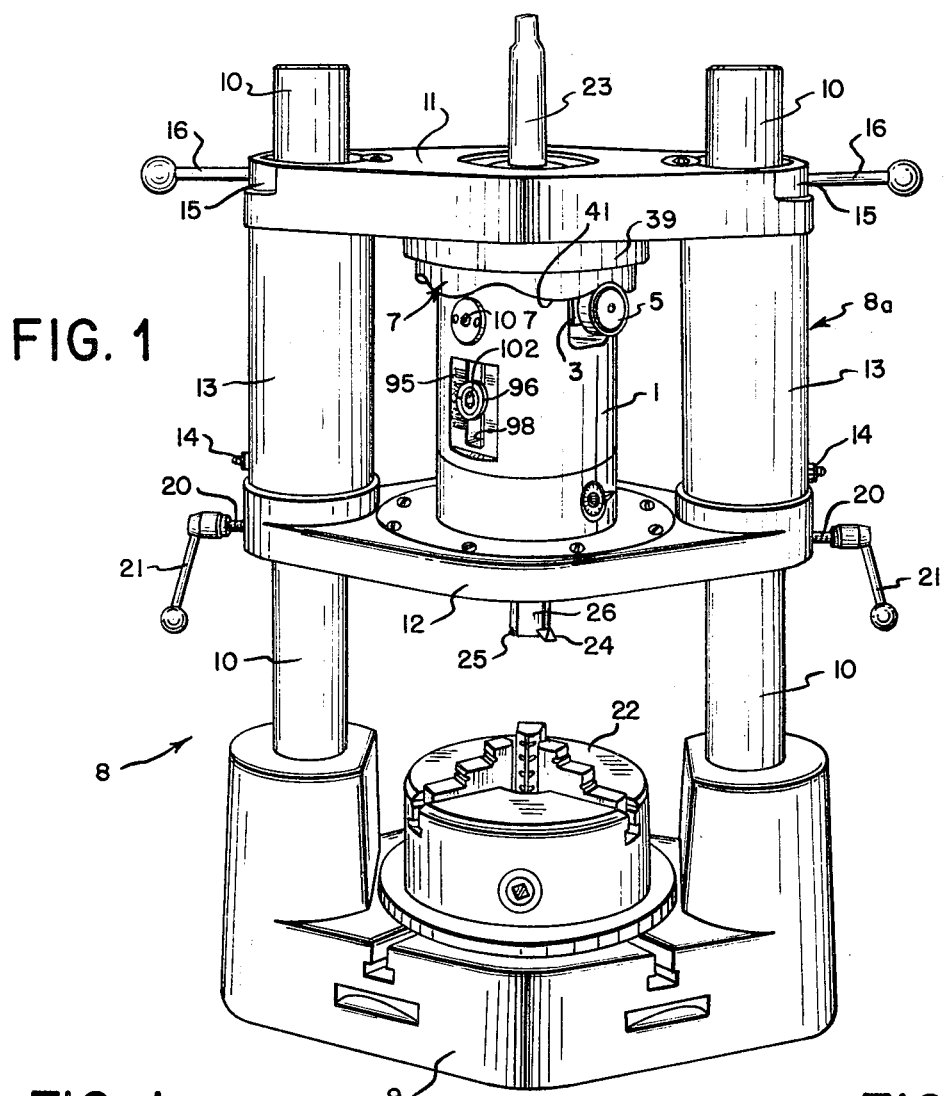
FIG. 1 is a perspective view of the apparatus.

Referring to these drawings the drill head rotary casing is indicated by reference numeral 1, the bell crank lever by numeral 2, the first arm of this lever by numeral 3 and the second arm by numeral 4. The sensing member or cam follower is roller 5 which is mounted by means of a ball bearing on the end of arm 3. Bell crank 2 is mounted for rocking movement on a cross shaft 6. One form of cam-like pattern is shown in FIG. 1a and is indicated by reference numeral 7.

Figure 1A:
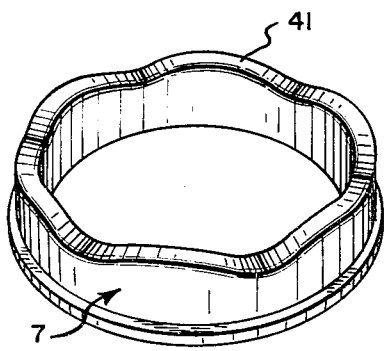
FIGS. 1a and 1b are perspective views of two patterns.
Figure 2:
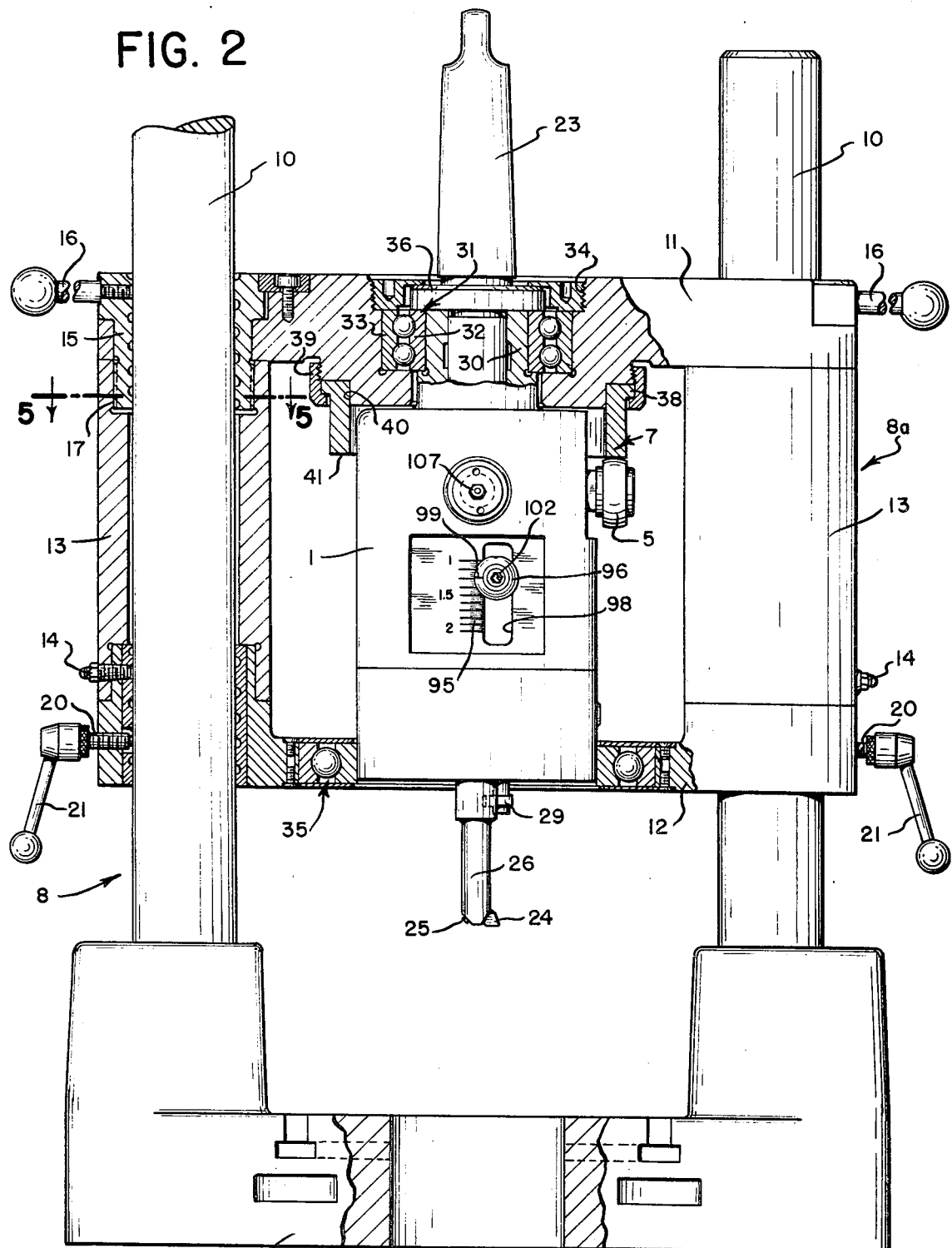
FIG. 2 is a front elevational view of the apparatus.

These parts are mounted in a sliding guide and supporting mechanism indicated generally by reference numeral 8 and shown in FIGS. 1 and 2. This mechanism comprises a base 9 having two spaced parallel columns 10 extending upwardly therefrom. Adjustably mounted on columns 10 are upper and lower horizontal plate members 11 and 12 which together support rotary casing 1. Plate members 11 and 12 are interconnected by means of sleeve members 13 which surround the respective columns 10. Lower plate member 12 is secured to the lower ends of the respective sleeves 13 by means of set screws 14.

Upper plate 11 is removably secured to the respective upper ends of the two sleeves 13 by means of a bushing 15 to which a handle 16 is secured so that the bushing can be partially rotated manually. Bushing 15 has three projecting arcuate lugs 17 (FIG. 5) equally spaced around its periphery which engage corresponding arcuate lugs 18 projecting inwardly from the upper portion of sleeve 13. Between the three lugs 18 there are three spaces 19 which are longer in an arcuate direction than the lugs 17. Hence when lever 16 is operated to turn sleeve 15, lugs 17 may be brought into alignment with spaces 19 and when this has been done on both sides of the apparatus the upper plate 11 may be slid upwardly on columns 10 and separated from sleeves 13 for a purpose which will appear later on.

When upper plate 11 is connected to sleeves 13 the upper and lower plates 11 and 12 and their interconnecting sleeves 13 form an adjusting unit 8a which can be moved up or down the columns 10, and such unit can be secured to the columns at any desired position by means of set screws 20 which are manipulated by clamping levers 21. In this way rotary casing 1 can be properly adjusted with respect to the workpiece to be operated on which may be held in position by the jaws of a chuck 22, or any other suitable work holder mounted on the top of base 9 in a conventional manner.

Figure 3:
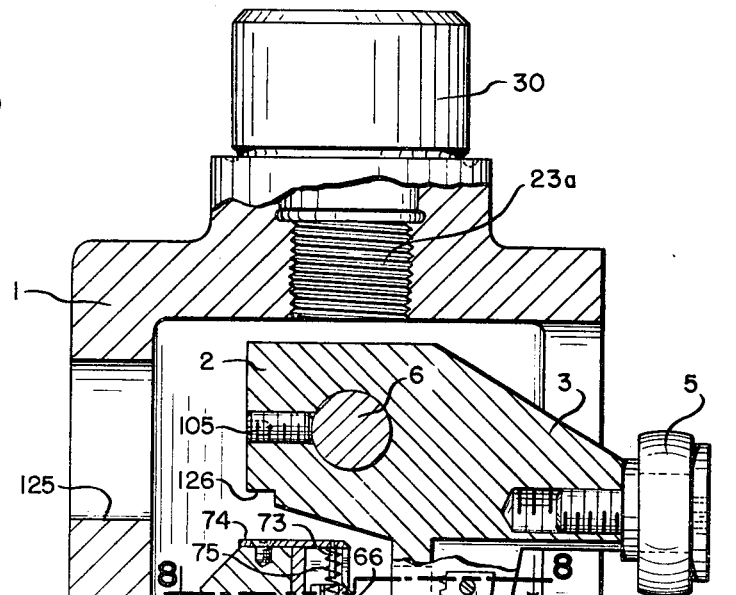
FIG. 3 is a vertical central section of the rotary casing in the plane of the lever.

It will be assumed that the apparatus is to be used in connection with an upright drilling machine, and accordingly base 9 will be secured to the table or bed of such machine by conventional clamping devices (not shown) which may be arranged to engage base 9 in the recesses indicated in its sides. Rotary casing 1 has at its upper end a tapered shank 23 which is placed within the taper spindle nose or driving socket of the drilling machine and has an aperture provided with a corresponding taper to receive shank 23. The inner end portion of driving shank 23 which is not visible in the drawings is externally threaded and engaged with the internally threaded portion 23a of casing 1 below neck 30 (FIGS. 3 and 4). Projecting beneath rotary casing 9 there is a cutting tool 26 having a tapered shank 27 at its upper end which is received within a tapered aperture in a tool holder 28 arranged at the lower end of casing 1. A hardened cutting point 24 is removably secured to this shank by means of a set screw 25. Tool 26 is secured in position by a conventional retainer member 29.

Drill head casing 1 is cylindrical in outer form and at its upper end has a neck portion 30 of reduced diameter which projects into an aperture in upper plate member 11 and is supported therein by means of a ball bearing 31. The inner race 32 of this bearing is mounted on neck portion 30 and the outer race 33 within the aperture in plate 11 and is held therein by a threaded ring member 34 which clamps the bearing races against a shoulder at the lower part of the aperture. At its lower end casing 1 is supported in a second ball bearing 35, the inner race of which surrounds the lower portion of the casing and its outer race being mounted in an aperture in lower plate member 12.

Accordingly drill head casing 1 is firmly supported by these bearings both below and above in the adjusting unit 8a. This adjusting unit can be shifted upwardly on columns 10 to place and maintain tapered shank 23 within the taper nose or driving socket of the drilling machine. The drill head casing 1 and adjusting unit 8a (consisting of plates 11, 12 and sleeves 13) are moved down the columns 10 by the drilling machine feed to advance cutting tool 24 in the workpiece. A flange 36 near the bottom of the taper of shank 23 (FIG. 2) enables the adjusting unit 8a to force tapered shank 23 into the tapered nose or driving socket (not shown) of the drilling machine so that adjusting unit 8a will be supported by the drilling machine. Also flange 36 enables the downward force applied by the feed of the drilling machine to cause the drill head casing 1 and cutting tool shank 26 to move downwardly as the feed proceeds, adjusting unit 8a sliding downwardly on columns 10, clamping levers 16 and 21 being manipulated to release their clamping effect on columns 10.

Figure 7:
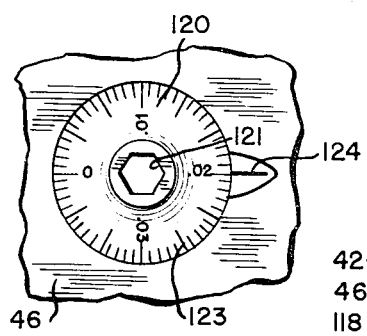
FIG. 7 is a view in elevation of a detail indicated by line 7—7 at the right of FIG. 3.

The cam-like pattern such as shown at 7 in FIGS. 7 and 2 is a ring-like member having a flange 38 at its upper end which is engaged by a nut member 39 to releasably hold the pattern 7 in position on a circular projection 40 which is disposed on the lower surface of upper plate 11 in co-axial relation to the axis of driving shank 23. The working face 41 of cam-like pattern 7 is annular in form and concentric with the axis of drill head casing 1 and shank 23. Working face 41 is at right angles to such axis.

It will be understood that the interior of drill head casing 1 is hollow and in addition to lever 2 also encloses a tool supporting carriage 42 for the purpose of moving tool 26 crosswise of the casing. Carriage 42 comprises a base or platform portion 43 which is generally square in plan view as shown in FIG. 9 with its opposite front corners cut off at a 45° angle as shown so as to more easily operate within the casing and having a rounded rear side 44 for the same purpose. Slightly spaced from rear side 44 the carriage has an integral upstanding head member 45 disposed at right angles to base or platform 43. These parts have considerable thickness and the rear surface of head member 45 is rounded because it is important that the carriage be of rigid and inflexible construction.

In order to permit the assembly of carriage 42 within casing 1, and also other parts to be mentioned later, the casing is provided at its bottom with a removable ring shaped portion 46. Portion 46 has a circular flange portion 47 at its upper end which fits over two similar sector-shaped projections 48 which project downwardly from the diametrically opposite sides of the interior of casing 1. Ring-shaped portion 46 is secured in position by means of six screws 49, three on each side of the casing which extend through member 46 and their upper end poritons 50 are threaded and screwed into apertures in the two sector-shaped members 48.

It is important that carriage 42 move with as little friction as possible and its opposite side portions 51 are received within guideways 52 (FIGS. 3 and 4) which are parallel with a plane through the center with bell crank 2. The bottoms 53 of guideways 52 are formed by shelves on ring-shaped portion 46. Their side walls 54 are formed by the flat portions of the sector-shaped projections 48 at the bottom of casing 1 (FIG. 9). The upper surfaces 55 of guideways 52 are on the bottom surface of casing 1. With the various surfaces of guideways 52 thus arranged carriage 42 can be removed from casing 1 by removing the ring-shaped portion 46.

Bearing rollers 56 in appropriate cages are disposed on the upper surfaces of side portions 51, and similar bearing rollers 57 in similar cages (not shown) support the lower surfaces of edge portions 51. Similar bearing rollers 58 are vertically arranged along the opposite side edges of side portions 51.

In order for carriage 45 to support cutting tool 26 tool holder 28 is secured to the bottom of carriage base 43. Its flat upper surface fits snugly against the flat lower surface of base 43 and these parts are held in this position by means of two bolts 59. These have special T-shaped heads 60 which are received within T-shaped slots 61 formed in carriage base 43. T-shaped slots 61 extend in parallel relation throughout the length of carriage base 42 as shown in dotted lines in FIG. 9. At the lower ends of bolts 59 locking nuts 62 are placed on extended threaded portions and within recesses formed in the lower surface of tool support 28. Nuts 62 by means of a series of spring washers 63 resiliently urge the heads 60 of bolts 59 against the lower surfaces of the T-shaped slots 61. This permits the adjustment of tool holder 28 on the lower surface of carriage base 43 in a direction parallel with guideways 52 for a purpose which will be referred to later on. However tool support 28 is thus firmly secured to carriage 42 at all positions.

The connection whereby the rocking motion of bell crank 2 is transferred to carriage 42 is shown in FIGS. 3, 4 and 8. Carriage head 45 extends upwardly within casing 1 in parallel relation to second arm 4 of lever 2 when arm 4 is vertical, although these parts are moved slightly out of parallel relation during operation of the lever. On arm 4 there is an actuator member 64, and on carriage head 45 a cooperating plate member 65. Actuator 64 has a rounded or arcuate surface 66 so as to make only a line contact with plate 65 as it transfers the motion of arm 4 to carriage head 45. Such contact line is parallel with the axis of pivot shaft 6 of the lever and lies in a plane which passes through the center of this shaft, such plane being at right angles to a second plane passing through the center of shaft 6 and the line of contact between the upper surface of sensing roller 5 and the lower surface of cam-like pattern 7. These are the operating planes of lever 2.

In order to reduce to a minimum the friction in the operation of this mechanism plate 65 is provided on its inner surface with a series of bearing rollers which like the rollers previously referred to are supported in a conventional cage. Plate 65 is mounted on carriage head 45 by means of a holder member 68 which is secured to the face of the carriage head by four cap screws 69, two of which are shown in FIG. 8. Member 68 has a lengthwise recess 70 (FIG. 8) which is somewhat wider than plate 65 and provided along its side edges with flanges 71. These flanges overlie the side margins of plate 65 and serve to retain the plate within holder member 68. Bearing rollers 67 are arranged between the inner surface of plate 65 and the bottom of recess 70.

The extent of the sliding motion of plate 65 is limited by having the plate engage the upper end of a pin 72 which is mounted in carrier base 43, and by second pin 73 which is mounted in a thin plate 74 secured at the top of carriage head 45 by screws as shown in FIG. 3. A light helical spring 75 is arranged on pin 73 to bias plate 65 in the downward direction.

As the sensing roller 5 is caused to move downward by the cam-like pattern 7 the actuator 64 on second arm 4 of the bell crank 2 forces plate 65 towards the left thus by pressure on carriage head 45 causing carriage 42 to move in guideways 52 towards the left. When the surface of cam-like pattern 7 allows sensing roller 5 to move upwardly, two coil springs 76 (FIGS. 3, 6 and 9) are so arranged as to cause the parts to move in the opposite direction.

Figure 6:
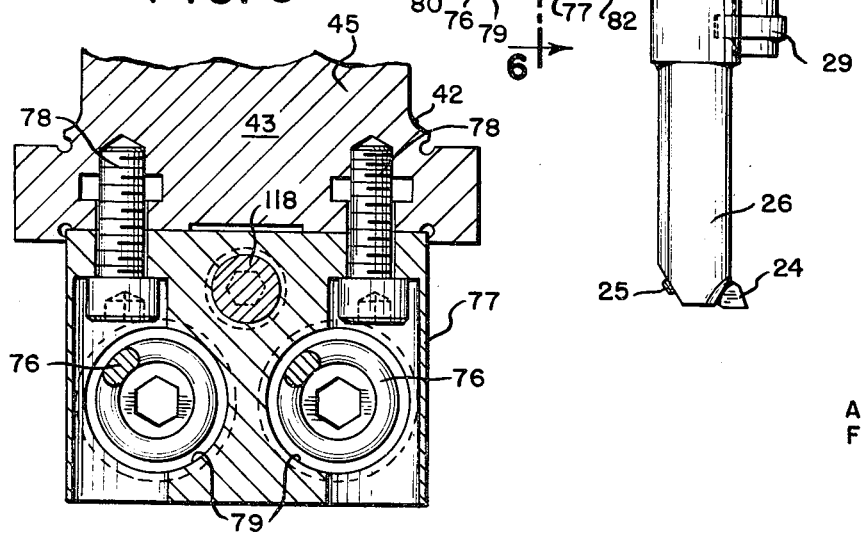
FIG. 6 is a detailed vertical section taken on line 6—6 of FIG. 3.

A block member 77 is permanently fixed to the lower surface of carriage base 43 by means of cap screws 78 shown in FIG. 6 and has two circular apertures 79 which are threaded from end to end. The inner end portions of springs 76 are in these apertures, and the outer ends are received in similar threaded apertures 80 in the wall of ring-like portion 46. Springs 76 engage a threaded member 81 in apertures 80 at their outer ends and at their inner ends engage similar members 82 in apertures 79. Consequently springs 76 tend to force block member 77 and carriage 42 towards the right in FIG. 3. One or both of members 81 and 82 can be adjusted from the outside of the casing to vary the force of springs 76 as required for proper operation of the apparatus.

In operating the apparatus, cutting point 24 is arranged in the plane passing through the axis of sensing roller 5 and the axis of cutting tool 26, and the sensing roller 5, following the surface of cam-like pattern 7, under the compulsion of springs 76, causes carriage 42 to move cutting tool 26 with its cutting point 24 crosswise of drill head casing 1 to carry cutting point 24 outwardly, for example, to form the corners of the hexagonal aperture of workpiece 83, and withdraw the cutting point towards the center of the casing proportional to the rotation of the cutting point so as to form the straight sides of the hexagonal aperture.

The lever 2 is in a state of continuous oscillation, making six oscillations for each rotation, when using pattern 7 to form the aperture of workpiece 83. Hence there is almost continuous motion between the actuator 64 and plate 65 showing the importance of the construction shown which reduces frictional resistance to a minimum.

The construction of the invention also includes provision for ready adjustment of the stroke of carriage 42 and tool 26 for the purpose of setting up the apparatus to cut holes of different size using the same pattern. This adjustment is accomplished by mounting the actuator 64 so that it can be shifted along the second arm 4 of lever 2 to increase or decrease the movement of carriage 42. Provision is also made for causing this shifting.

Referring to FIG. 8 actuator 64 is a U-shaped member having legs 84 which contact the opposite side surfaces of the channel-shaped second arm 4. The actuator is held in position on this arm by means of a threaded pin 85 which at its inner end is secured in a threaded aperture at the center of the actuator and at its outer end receives a nut 86 and a plurality of spring washers 87 so that the nut does not clamp the actuator against movement but permits controlled movement lengthwise of arm 4. Pin 85 passes through a slot 88 in arm 4 (FIG. 4) and moves in this slot as the actuator is adjusted.

To enable actuator 64 to be adjustably moved along arm 4 from the exterior of casing 1 a rack member 89 is secured to one side of arm 4. This rack has teeth 90 which are engaged by the teeth of a gear 91 which has a short shaft 92 that turns in an aperture 93 provided in the adjacent leg 84 of actuator 64. The outer end of shaft 92 is exposed through aperture 93 and is provided with a hexagonal central opening 94 to recive an elongated hexagonal key (not shown). The turning of this key causes the movement of actuator 64 lengthwise of arm 4.

It is important to indicate on the outside of the apparatus the position to which the actuator has been adjusted and this is done by means of a scale 95 and a rotary stroke indicator 96 (FIGS. 2 and 4). Indicator 96 has a circular body 97 which fits within a rectangular aperture 98 in the wall of casing 1 opposite the path of hexagonal aperture 94 as the cutter is moved along arm 4. Indicator 96 is a circular member somewhat larger in diameter than the width of slot 98 and bearing a reference mark 99 which cooperates with scale 95. On the inner end of body member 97 there is a nut member 100 and spring disc 101 to frictionally hold the stroke indicator at any position in slot 98 to which it may be moved. Stroke indicator 96 has a hexagonal aperture 102 the same size as aperture 94 in gear 91. Accordingly when a key 103 having a hexagonal shaft 104 is inserted through aperture 102 and its end inserted in aperture 94, the turning of this key will simultaneously adjust actuator 64 and move stroke indicator 96 by a corresponding amount along slot 98.

When any aperture is to be cut, such for example as the hexagonal aperture of workpiece 83 (FIG. 10) the first step is to drill a round hole slightly smaller than the distance between the flats of the hexagon or other figure. Then the "size adjustment," that is, stroke indicator 96 is set to the approximate size of the hexagonal hole to be cut. While this is referred to as a "rough" adjustment its degree of accuracy is excellent because of the line contact previously referred to between actuator 64 and sliding plate 65. After this adjustment has been made the cutting tool is inserted in the workpiece by manipulating the drilling machine and the adjusting unit 8a. The drilling machine is started and if the cutting point 24 does not follow the proper size of hole this is corrected by the fine adjustment mechanism.

This fine adjustment mechanism comprises a spindle 115 (FIG. 3) which is mounted for rotation in a horizontal aperture through the upper portion of tool holder 28. Spindle 115 has a flange 116 at one end and is threaded at the outer end to receive a pair of adjusting and lock nuts 117. These nuts are adjusted until spindle 115 has no end play in its aperture. To the left beyond flange 116 the remaining portion of spindle 115 is provided with a fine screw thread 118 which is received within a similarly threaded opening in block 77. By turning spindle 115 tool holder 28 and cutting tool 26 with its cutting point 24 are adjusted along the bottom surface of the carriage base 42, being held in adjustable but precise position by means of T-shaped bolts 59 (FIG. 4) previously referred to. Spindle 115 provides a precise micrometer adjustment of cutting point 24 with reference to the workpiece.

The rotation of spindle 115 is accomplished from the outside of casing 1 by means of a hexagonal key member 103. Within a circular recess 119 (FIG. 3) on the outer surface of ring-shaped portion 46 of the casing and in axial alignment with adjusting spindle 115 a micrometer indicating disc 120 is mounted (FIG. 7). This disc has a fractional mount which enables it to remain in any position to which it may be turned. It has a hexagonal aperture 121 at its center which is in alignment with a similar hexagonal aperture 122 in the end of spindle 115. When key 103 is inserted and spindle 115 is turned the extent of movement of the cutting point 24 resulting is indicated by a circular scale 123 around the rim of disc 120. This scale cooperates with a stationary reference mark 124 on ring-like portion 46. The scale may be laid out in fractions of a mm. or in thousandths of an inch.

In the interest of precision of operation lever 2 does not rotate on shaft 6 but is secured thereto by means of a set screw 105 so that the shaft turns and the shaft is supported at each end in a combination roller bearing and ball thrust bearing 106. These bearings are arranged in suitable apertures on each side of casing 1. A grease connection 107 is provided for lubrication.

Figure 1B:
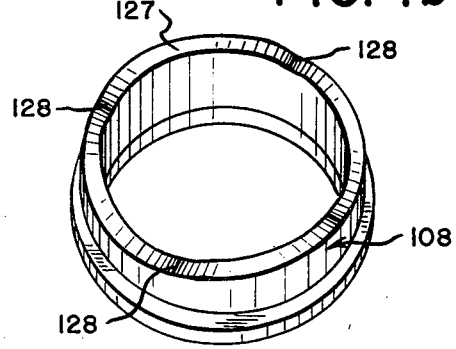

Referring again to FIGS. 1 and 2 when it is desired to change the cam-like pattern 7 so as, for example to remove this pattern and insert a different pattern such as pattern 108 of FIG. 1b in order to cut a square aperture as is shown in workpiece 109 (FIG. 11), the adjusting assembly is lowered on columns 10 and the clamping levers 21 are operated, which causes the lower plate 12 and the sleeve 13 to be clamped to the columns 10. Sensing roller 5 is removed from the pattern 7 by applying a strong downwardly directed pressure. To accomplish this a bar or other appropriate tool (not shown) may be inserted through an opening 125 and engaged with shoulder 126 on the lower left of arm 2. A spacer mandrel or spacer bolt held in position by the force of springs 76 is introduced between the ring-like portion 46 and the carriage base 43 (FIG. 3). Sensing roller 5 is then unscrewed from lever arm 3. Bushings 15 are released by means of handles 16, and upper plate member 11 including casing 1 is raised from the lower plate 12. Nut member 39 is released and the pattern 7 removed. Pattern 108 can be applied in its place and the procedure reversed to reassemble the apparatus.

It will be understood that instead of employing the cutting tool 24 to cut an internal aperture such as shown in FIGS. 10 and 11, a profile piece such as shown in FIG. 12 can be clamped in chuck 22 and the apparatus operated as previously described to cut an external surface of hexagon, square, or other shape, depending upon the pattern employed.

Many patterns different from patterns 7 and 108 can be applied to the apparatus for the purpose of cutting holes or profiles of many different shapes. One simple but different shape is a rectangle and the pattern for a rectangle is a modification of pattern 108 for a square. Pattern 108 has four lobes 127 of equal length between the valleys 128 and all of the same height. A pattern for a rectangle has two equal length long lobes and two equal length shorter lobes, the short and long lobes alternating.

The apparatus of the invention can also be used for the purpose of cutting apertures of unusual shape beyond the size range of the particular apparatus or beyond the range of the particular patterns available. Thus for example the aperture shown in outline in FIG. 13 could be cut in three successive steps. First the machine would be set up to cut from the workpiece a square indicated by numeral 111 and including the dot and dash lines forming a complete square. After that the machine would be set up to cut a rectangle and the left-hand rectangular portion 112 would be cut. Following that the rectangle 113 shown at the right would be cut thus producing the outline of unusual shape as shown.

FIG. 14 which shows a twelve-sided figure 114 can be cut by setting up the apparatus to cut a hexagonal aperture, and following that, cutting a second hexagonal aperture after turning the workpiece in the chuck through an angle of 30%, that is, the two hexagonal figures are offset with respect to one another and thus form a twelve-sided figure.

We claim:

1. Apparatus for shaping internal and external surfaces of a workpiece including a rotary casing, means for rotatably supporting said casing, driving means for the rotary casing, a carriage mounted within the casing for crosswise movement at right angles to the casing axis, a tool holder secured to the carriage and arranged to support a cutting tool projecting from one end of the casing with its axis parallel to the casing axis, a circular cam-like pattern mounted on said supporting means in fixed position coaxially of the casing, and having a working face at right angles to the casing axis, a carriage-moving mechanism mounted within the casing having a sensing member for continuously engaging said working face and causing the carriage to move in a manner corresponding to the shape of the cam-like pattern at each revolution of the casing; the carriage-moving mechanism comprising a bell crank including first and second arms, the first arm engaging the cam-like pattern, and the second arm being operatively connected to the carriage to move it in one direction, and resilient means associated with the carriage for moving it in the opposite direction and thus to maintain the first arm in contact with the cam-like pattern; the operative connection between the second arm and the carriage comprising a head member projecting from the carriage the inner surface of which is approximately parallel to the axis of the rotary casing, the second arm of the bell crank extending alongside of and in spaced relation to the head member, and an actuator member adjustably shiftable lengthwise of said arm for contacting the head member.

2. Apparatus for shaping internal and external faces of a workpiece as set forth in claim 1 wherein means is provided for adjusting the position of the actuator member lengthwise of the second arm of the lever for varying the extent of crosswise movement of the carriage and cutting tool.

3. Apparatus for shaping internal and external surfaces of a workpiece as set forth in claim 2 wherein the actuator adjusting mechanism comprises a rack member secured lengthwise of the arm, an adjusting gear mounted for rotation on the actuator having teeth meshing with the rack teeth, and means for turning said gear from outside the casing.

4. Apparatus for shaping internal and external surfaces of a workpiece as set forth in claim 3 in which the means for turning the adjusting gear includes a manually operated rod-like key insertible from the exterior of the casing into operative engagement with the adjusting gear, means actuated by said key being provided for indicating the position of the actuator lengthwise of the second arm.

5. Apparatus for shaping internal and external faces of a workpiece as set forth in claim 1 in which a plate having a flat surface for engagement by the actuator is mounted in lengthwise sliding relation on the carriage head member.

6. Apparatus for shaping internal and external faces of a workpiece as set forth in claim 5 in which the actuator has a semi-circular face for contacting the flat surface of the sliding plate on the carriage head member and making line contact therewith parallel to the axis of the lever.

7. Apparatus for shaping internal and external surfaces of a workpiece including a rotary casing, means for rotatably supporting said casing, driving means for the rotary casing, a carriage mounted within the casing for crosswise movement at right angles to the casing axis, a tool holder secured to the carriage and arranged to support a cutting tool projecting from one end of the casing with its axis parallel to the casing axis, a circular cam-like pattern mounted on said supporting means in fixed position coaxially of the casing, and having a working face at right angles to the casing axis, a carriage-moving mechanism within the casing having a sensing member for continuously engaging said working face and causing the carriage to move in a manner corresponding to the shape of the cam-like pattern at each revolution of the casing; the carriage-moving mechanism comprising a bell crank including first and second arms, the first arm engaging the cam-like pattern, and the second arm being operatively connected to the carriage to move it in one direction, and resilient means associated with the carriage for moving it in the opposite direction and thus to maintain the first arm in contact with the cam-like pattern; the cam-like pattern surrounding the upper portion of the rotary casing and the carriage-moving mechanism having an arm projecting through the side wall of the casing into continuous engagement with said working surface.

8. Apparatus for shaping internal and external surfaces of a workpiece including a rotary casing, means for rotatably supporting said casing, driving means for the rotary casing, a carriage mounted within the casing for crosswise movement at right angles to the casing axis, a tool holder secured to the carriage and arranged to support a cutting tool projecting from one end of the casing with its axis parallel to the casing axis, a circular cam-like pattern mounted on said supporting means in fixed position coaxially of the casing, and having a working face at right angles to the casing axis, a carriage-moving mechanism mounted within the casing having a sensing member for continuously engaging said working face and causing the carriage to move in a manner corresponding to the shape of the cam-like pattern at each revolution of the casing; the carriage-moving mechanism comprising a bell crank including first and second arms, the first arm engaging the cam-like pattern, and the second arm being operatively connected to the carriage to move it in one direction, and resilient means associated with the carriage for moving it in the opposite direction and thus to maintain the first arm in contact with the cam-like pattern; said supporting means comprising two posts arranged in fixed parallel relation to each other, two parallel members slidably mounted on said posts, means for releasably securing each of said members to the posts, one of said members having a bearing for the casing near the end from which the cutting tool projects, the second of said members having a bearing for the opposite end of the casing, and means on the second member for removably mounting the cam-like pattern, the second member being shiftable along said posts to separate it from the rotary casing and permit removal and replacement of the cam-like pattern.

9. Apparatus for shaping internal and external faces of a workpiece as set forth in claim 8 having in addition means surrounding each of said posts for interconnecting the two parallel members and enabling them and the rotary casing supported between them to move as a unit along the two posts as the cutting tool feeds with respect to the workpiece.

10. Apparatus for shaping internal and external surfaces of a workpiece including a rotary casing, means for rotatably supporting said casing, driving means for the rotary casing, a carriage mounted within the casing for crosswise movement at right angles to the casing axis, a tool holder secured to the carriage and arranged to support a cutting tool projecting from one end of the casing with its axis parallel to the casing axis, a circular cam-like pattern mounted on said supporting means in fixed position coaxially of the casing, and having a working face at right angles to the casing axis, a carriage-moving mechanism mounted within the casing having a sensing member for continuously engaging said working face and causing the carriage to move in a manner corresponding to the shape of the cam-like pattern at each revolution of the casing; the carriage-moving mechanism comprising a bell crank including first and second arms, the first arm engaging the cam-like pattern, and the second arm being operatively connected to the carriage to move it in one direction, and resilient means associated with the carriage for moving it in the opposite direction and thus to maintain the first arm in contact with the cam-like pattern; rotary casing consists of a main portion and a ring-shaped bottom portion removably secured to the main portion, the main portion having spaced parallel coplanar trackways and the bottom casing portion having similar trackways vertically spaced from and parallel to the trackways on the main portion, and spaced parallel trackways at right angles thereto, the carriage having plate-like base with parallel side edge portions, and said trackways constituting guideways for the opposite marginal portions of said carriage.

References Cited

UNITED STATES PATENTS

| 158,629 | 1/1875 | Connor | 82—19 |
| 2,661,640 | 12/1953 | Ruegg | 77—61 |

LEONIDAS VLACHOS, Primary Examiner

U.S. Cl. X.R.

77—58; 82—2